(12) United States Patent
Akyurek et al.

(10) Patent No.: US 11,902,244 B2
(45) Date of Patent: *Feb. 13, 2024

(54) ADDRESS GENERATION FOR NETWORKS

(71) Applicant: TEXAS INSTRUMENTS INCORPORATED, Dallas, TX (US)

(72) Inventors: Alper S. Akyurek, Richardson, TX (US); Ariton E. Xhafa, Plano, TX (US); Jianwei Zhou, Dallas, TX (US); Ramanuja Vedantham, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/170,714

(22) Filed: Feb. 17, 2023

(65) Prior Publication Data

US 2023/0208806 A1 Jun. 29, 2023

Related U.S. Application Data

(63) Continuation of application No. 17/556,215, filed on Dec. 20, 2021, now Pat. No. 11,611,530, which is a
(Continued)

(51) Int. Cl.
*H04L 61/5014* (2022.01)
*H04L 61/5092* (2022.01)
(Continued)

(52) U.S. Cl.
CPC ...... *H04L 61/5014* (2022.05); *H04L 61/5092* (2022.05); *H04L 61/5007* (2022.05);
(Continued)

(58) Field of Classification Search
CPC ............ H04L 61/5007; H04L 61/5014; H04L 61/5092; H04L 2101/604; H04L 2101/659; H04L 2101/668
See application file for complete search history.

(56) References Cited

U.S. PATENT DOCUMENTS

| 8,364,847 B2 | 1/2013 | Anipko et al. |
| 2006/0029002 A1* | 2/2006 | Park .................. H04L 61/00 370/254 |

(Continued)

FOREIGN PATENT DOCUMENTS

| CN | 101335697 | 12/2008 |
| CN | 101841573 | 9/2010 |

(Continued)

OTHER PUBLICATIONS

Deering, et al., "Internal Protocol, Version 8 (IPv6) Specification", Internet Engineering Task Force, Dec. 1998, pp. 1-39.
(Continued)

*Primary Examiner* — Gil H. Lee
(74) *Attorney, Agent, or Firm* — Mandy Barsilai Fernandez; Frank D. Cimino

(57) ABSTRACT

A network includes at least two nodes that employ a routing protocol to communicate across a network. One of the nodes is a parent node and another of the nodes is a child node of the parent node. An address generator assigns a unique network address to the child node by appending an address value of a number of bits to a parent address of the parent node to create the unique network address for the child node.

20 Claims, 3 Drawing Sheets

Related U.S. Application Data continuation of application No. 14/797,764, filed on Jul. 13, 2015, now Pat. No. 11,206,239.

(60) Provisional application No. 62/053,045, filed on Sep. 19, 2014.

(51) Int. Cl.
 *H04L 61/5007* (2022.01)
 *H04L 101/604* (2022.01)
 *H04L 101/659* (2022.01)
 *H04L 101/668* (2022.01)

(52) U.S. Cl.
 CPC .. *H04L 2101/604* (2022.05); *H04L 2101/659* (2022.05); *H04L 2101/668* (2022.05)

(56) References Cited

U.S. PATENT DOCUMENTS

| | | | | |
|---|---|---|---|---|
| 2009/0222559 | A1* | 9/2009 | Anipko | H04L 61/5007 709/228 |
| 2009/0257439 | A1* | 10/2009 | Xu | H04L 45/033 370/389 |
| 2010/0189264 | A1* | 7/2010 | Haddad | H04L 61/5076 380/283 |
| 2012/0117208 | A1 | 5/2012 | Shaffer et al. | |
| 2012/0290700 | A1* | 11/2012 | Li | H04L 61/5007 709/223 |
| 2016/0043942 | A1* | 2/2016 | Purohit | H04W 40/244 370/338 |

FOREIGN PATENT DOCUMENTS

| | | |
|---|---|---|
| CN | 102292962 | 12/2011 |
| CN | 103202005 | 7/2013 |
| CN | 103702383 | 4/2014 |

OTHER PUBLICATIONS

R. Droms, et al. Dynamic Host Configuration Protocol for IPv6 (DHCPv6):; Internet Engineering Task Force, Jul. 2003, pp. 1-101.
T. Narten, et al. "Neighbor Discovery for IP Version 6 (IPv6)"; Internet Engineering Task Force, Sep. 2007, pp. 1-97.
T. Winter, et al.; "RPL: IPV6 Routing Protocol for Low-Power and Lossy Networks"; Internet Engineering Task Force, Mar. 2012, pp. 1-157.

\* cited by examiner

ADDRESS GENERATION FOR NETWORKS

CROSS-REFERENCE TO RELATED APPLICATION

This application is a continuation of U.S. patent application Ser. No. 17/556,215, filed Dec. 20, 2021, which is a continuation of U.S. patent application Ser. No. 14/797,764, filed Jul. 13, 2015, now U.S. Pat. No. 11,206,239, issued Dec. 21, 2021, which claims the benefit of U.S. Provisional Patent Application No. 62/053,045, filed Sep. 19, 2014, each of which are incorporated by reference herein.

TECHNICAL FIELD

This disclosure relates to networks, and more particularly to address generation for ad hoc communications networks.

BACKGROUND

Ad hoc wireless communications networks are formed dynamically as nodes come within range of existing network resources. These networks may be utilized in many applications to provide communications between lower level devices on the networks such as sensors and upper tier devices communicating with the sensors. The sensors typically operate with limited processing and memory and are often constrained by various technical limitations. Such limitations may include issues related to power consumption, small form factors and communication challenges (low speed, high error rates, and so forth) used to form the respective networks. The challenges are further complicated as there can be interdependence between the issues. For example, the level of communication within the networks impacts the power consumption in the network devices.

In some applications, routing protocols are created that define relationships in the network and how the network operates as conditions change. For example, each node within the network can have a preferred parent node that it can communicate in an upwards direction and possibly having multiple child nodes for downward communications. The parent nodes are sometimes referred to as a root node or intermediate node and the child nodes are sometimes referred to as leaf nodes. Routing tables are utilized for message routing between nodes in the network according to the routing protocol. The routing tables and processing related to the tables can cause memory scalability and/or power consumption problems in the network depending on a given network configuration.

SUMMARY

This disclosure relates to address generation for ad hoc communications networks.

In one example, a network includes at least two nodes that employ a routing protocol to communicate across a network. One of the two nodes is a parent node and another of the two nodes is a child node of the parent node. An address generator assigns a unique network address to the child node by appending an address value of a number of bits to a parent address of the parent node to create the unique network address for the child node.

In another example, a method includes receiving a network address of a parent node at a child node from a network. The method includes appending an address value of a number of bits to the received network address of the parent node to create a unique network address for the child node. The method includes communicating the unique network address assigned to the child node to the parent node via the network.

In yet another example, a system includes a parent node to communicate a network address of the parent node via a routing protocol to a network. The system includes a child node to receive the parent address from the network via the routing protocol. An address generator appends an address value of a number of bits to the network address of the parent node to create the unique network address for the child node. An address router performs a comparison between unique address values of at least two child nodes in the network and a received destination address of a message from the network and routes the message through one of the at least two child nodes to a destination node that is a closest match to the destination address.

DETAILED DESCRIPTION

This disclosure relates to address generation for ad hoc communications networks. A system and network includes at least two nodes that employ a routing protocol to communicate across the network. The routing protocol can be a Routing for Low Power (RPL) networks protocol, for example. One of the two nodes is a parent node and one of the two nodes is child node of the parent node. In some cases, the parent node can be a root node which is at the top of a hierarchical network. In other cases, the parent node can also be an intermediate node that is downstream from the root node yet can have other child nodes, sometimes referred to as leaf nodes, communicating with it.

An address generator assigns a unique network address to the child node by appending an address value of a number of bits to a parent address of the parent node to create the unique network address for the child node. In this manner, each node in the network can assume its identity in part from its respective parent while creating a unique network address via various assignment protocols disclosed herein. The address assignment protocol allows each node to know which is the next hop in the ad hoc network for message routing since each node can determine its upstream or downstream routing needs based on its derived parental address assignment. This alleviates the need for routing tables as with conventional systems and thereby conserves memory in the respective nodes of the system. Moreover, handshaking in the network is reduced since each intermediate node that encounters a new child node does not have to communicate additional address announcements to the network since the incoming node is already a part of the parent's node address. Reducing handshaking communications reduces the power expended in the system.

Figure 1:
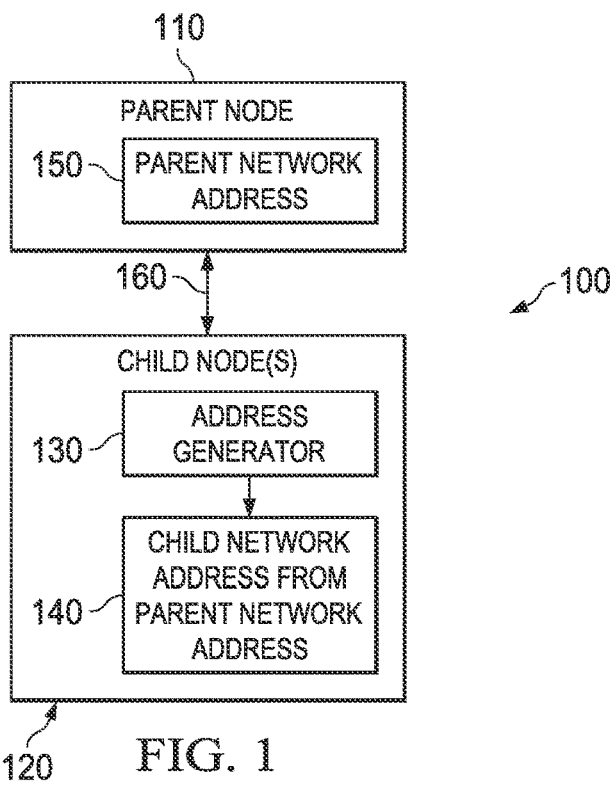
FIG. 1 illustrates an example network that includes a parent node and a child node that employs an address generator to generate a network address derived from the network address of the parent node.

FIG. 1 illustrates an example network 100 that includes a parent node 110 and a child node 120 that employs an address generator 130 to generate a network address 140 derived from the network address 150 of the parent node. In this example, the network 100 includes at least two nodes that employ a routing protocol to communicate across a wireless network connection 160. As shown, one of the two nodes is the parent node 110 and one of the two nodes is the child node 120 of the parent node. The nodes 110 and 120 can be implemented in software or in circuits in processors on integrated circuits, for example. In other examples, more than one child node 120 may be employed. Also, intermediate nodes (See e.g. FIGS. 3 and 4) may exist between the parent node 110 and the child node 120, where the intermediate nodes become the parent nodes for the lower-level child nodes. The address generator 130 assigns the unique network address 140 to the child node 120 by appending an address value of a number of bits to the parent address 150 of the parent node to create the unique network address for the child node.

In one example, the network address 140 can be assigned by the address generator 130 as the prefix portion of an Internet Protocol Version 6 (IPV6) Internet address; although other internet protocols could be implemented. For example, the address generator 130 receives a copy of the parent network address 150 from the parent node 110 and appends a number of one or more bits to the network address of the parent node to create a corresponding network address 140 for the child node 120. The address generator 130 can determine a value of the bits being appended (e.g., a node number), which can vary based on the number or an expected number of nodes at same level of hierarchy as the child node for which the address is being generated. The appending of bits can be implemented as a prefix (e.g., to the beginning of the parent address 150) or, in other examples, as a post fix (e.g., at the end of the parent address 150).

The communications between parent and child nodes can occur according to a network routing protocol. The routing protocol can be a Routing for Low Power Networks (RPL) protocol, for example. The address generator 130 can reside in the parent node 110, in the child node 120, or in the parent node and the child node, for example. The parent node can be a root node or an intermediate node and the child node can be a leaf node to the root node or the intermediate node in a destination oriented directed acyclic graph (DODAG) configuration, where the DODAG consists of at least one root node and at least one leaf node for the network 100.

With respect to RPL protocol in storing mode, nodes in conventional systems announce they are joining the DODAG by sending a Destination Advertisement Object (DAO) message to their preferred parent nodes in response to a DODAG information object request (DIO). The received information can be used for routing purposes and can be stored in the routing table in conventional systems. If there is any update within the routing table, the node must send an updated DAO to its own preferred parent in order to inform it about the update. The DAO transmission continues upward till it reaches the root node, which learns the next hop node it needs to select to reach a destination node within the network. This in turn requires the root node to learn the whole network by receiving DAOs from all nodes and store them in the routing table entries. However, even children of the root node will have the burden of supporting many nodes, and thus, these nodes will also have a memory problem.

Figure 4:
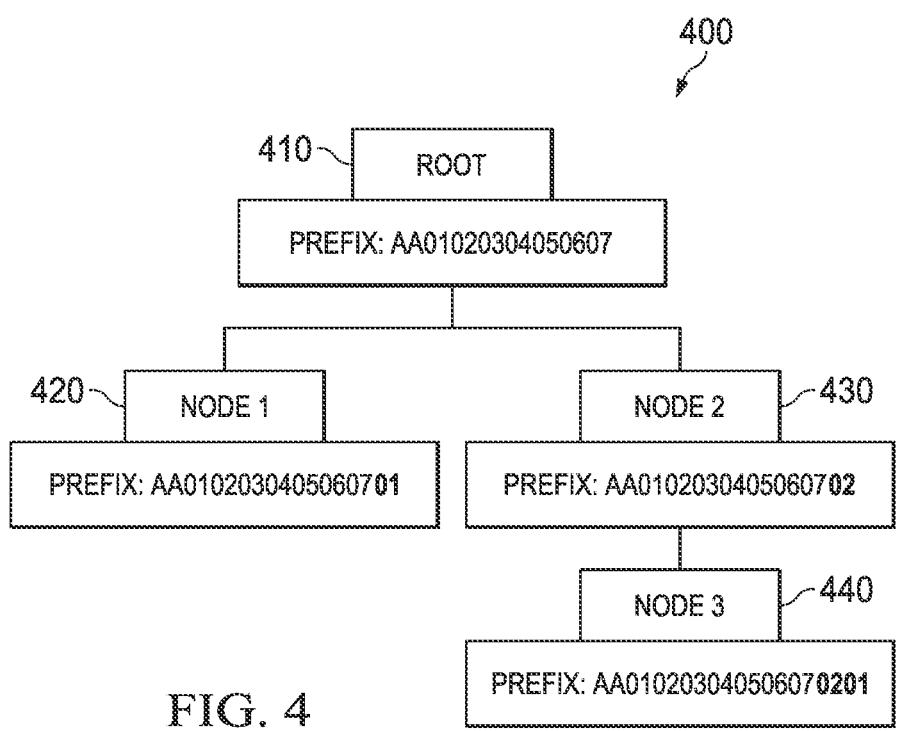
FIG. 4 illustrates an example network where child nodes derive network addresses from a network prefix of the parent nodes.

In the network 100, the RPL storing mode can be employed as its basis, however, with the following modifications. When the child node 120 desires to join a DODAG and announces its IPV6 address with a DAO message, it sets its IPV6 address by taking its preferred parent's address prefix and adding a value of predetermined size to the end (or beginning) of this prefix to create its own prefix and IPV6 address. This process ensures that this node will have a prefix, covered by its parent's prefix. This enforces a hierarchical version of the IPV6 address assignment throughout the network. As used herein, the term hierarchical refers to a network topology having two or more levels of hierarchy. For instance, a root node is the top level of the hierarchy and is connected to one or more other nodes at one lower level in the hierarchy. One or more other levels can be connected in the hierarchy. An example of hierarchical address assignment is shown in FIG. 4.

The address assignment protocol described herein has several advantages. One advantage is the elimination of the routing table in conventional systems. When a node desires to route a packet, it performs longest prefix matching among its neighbors to find the next hop (See discussion for FIG. 4 for further description of longest prefix matching). The intended destination is thus enabled to be within the neighbors prefix space by design. Another advantage is decreasing the number of required DAO messages transmitted. When a node joins a DODAG, for example, it sends a DAO to its parent with its own IP address. The preferred parent only sends a DAO if there is an update within its routing table. In the case of hierarchical networks described herein, since the incoming node is already a part of the node's prefix, it will not send an updated DAO to its own parent node, decreasing the number of DAO messages which improves the system performance and power consumption.

The RPL protocol is a Distance Vector IPv6 routing protocol for low power networks that specifies how to build a DODAG using an objective function and a set of metrics/constraints. The objective function can operate in the parent node 110 and/or the child node 120. The objective function operates on a combination of metrics and constraints to compute the 'best' path. There could be several objective functions in operation on the same node and mesh network because deployments vary with different objectives and a single mesh network may need to carry traffic with different requirements of path quality.

The objective function does not necessarily specify the metric/constraints but does dictate some rules to form the DODAG (e.g., the number of parents, back-up parents, use of load-balancing, and so forth). The graph built by RPL is a logical routing topology built over a physical network to meet a specific criteria and the network administrator may decide to have multiple routing topologies (graphs) active at the same time used to carry traffic with different sets of requirements. A node in the network can participate and join one or more graphs (e.g., "RPL instances") and mark the traffic according to the graph characteristic.

Figure 2:
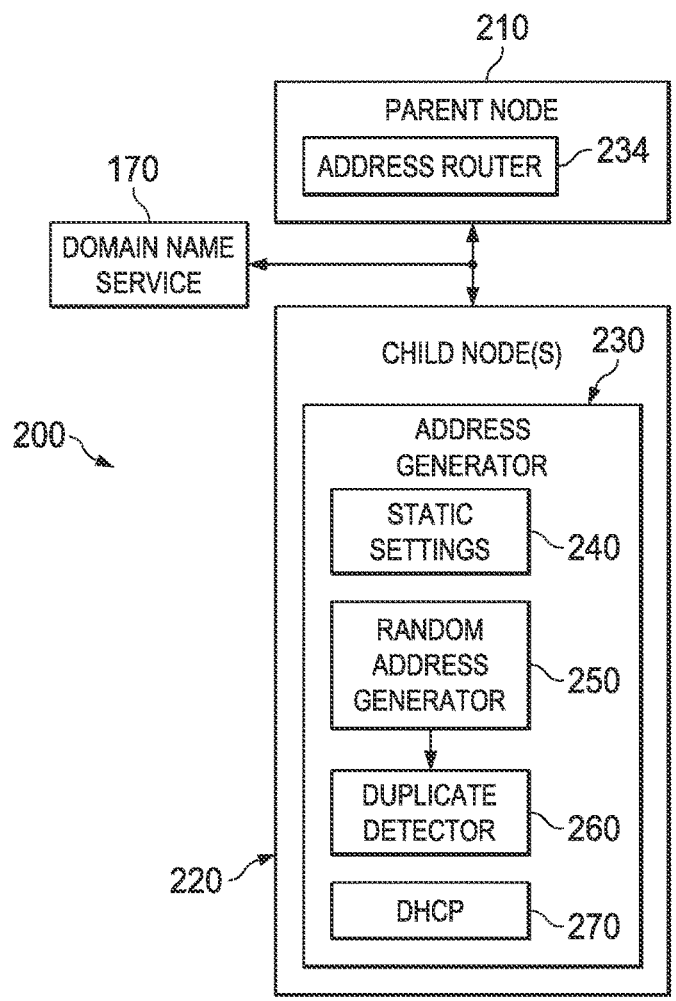
FIG. 2 illustrates an example system that includes a parent node and a child node that employs an address generator to generate a network address derived from the network address of the parent node.

FIG. 2 illustrates an example system 200 that includes a parent node 210 and a child node 220 that employs an address generator 230 to generate a network address derived from the network address of the parent node. In this case, the parent node 210 can be a root node or an intermediate node having child nodes, where the intermediate node communicates with the root node. As noted previously, the address generator 230 assigns its respective unique network address to the child node 220 by appending an address value of a number of bits to the parent address of the parent node 210 to create the unique network address for the child node. The parent node 210 can include an address router 234 that performs a comparison between unique address values of at least two child nodes and a destination address and routes a message to a destination node in the network graph of the parent that is a closest match to the destination address. As will be described below with respect to FIG. 4, if the parent node 210 sends a message to the network for subsequent routing to child nodes, the parent node receiving the message can determine where to route the message by matching the destination address to the respective unique addresses of the child nodes. The unique address that most closely matches the destination address in the message will then receive routed the message from the parent.

The child node 220 can announce its unique network address via a destination advertisement object (DAO) directed to the parent node, where the DAO is utilized in RPL protocol for example. The address generator 230 can include one or more assignment mechanisms to assign the unique network address for the child node 220 described herein.

In one example, the address generator utilizes a predetermined unique identifier setting 240 to assign the address value of the number of bits to form the unique network address of the child node 220. For example, this can be a hardware switch setting or firmware setting that defines a number (e.g., node number) which is then read and appended to the network prefix of the parent network address to create the unique address for the child.

In another example, the address generator 230 can utilize a random address generator 250 to assign a random number as the value of the number of bits to create the unique network address for the child node 220. If other nodes are also performing a random address assignment however, a duplicate address may be created. In order to resolve such conflicts, the address generator 230 can employ a duplicate detector 260 that performs a duplicate address detection to resolve an addressing conflict with another child node that utilizes a random address generator to assign its respective unique network address. Thus, each node randomly selects the value to be added to the parent's prefix. Before announcing the address with a DAO message for example, the child node 220 performs a duplicate address detection via the detector 260 to determine if any other nodes at the same level have the same unique network address. The address generator resolves the occurrence of a duplicate address by selecting another random value. The duplicate detection and random assignment of identifiers can be repeated the process until no duplicates exist at each level of hierarchy.

In yet another example of address assignment, the address generator 230 can employ a dynamic host configuration protocol (DHCP) 270 to assign the value of the number of bits to create the unique network address to the child node. For instance, each node can run a DHCP server and assign addresses to their respective child nodes. If network message routing is desired, it originates from the child toward a network node in the DODAG. Where the network address is unknown, a domain name service (DNS) 170 can be employed to determine the network address for at least one other node in the network which can then be utilized to route a message from the child to the respective node located by the service.

Figure 3:
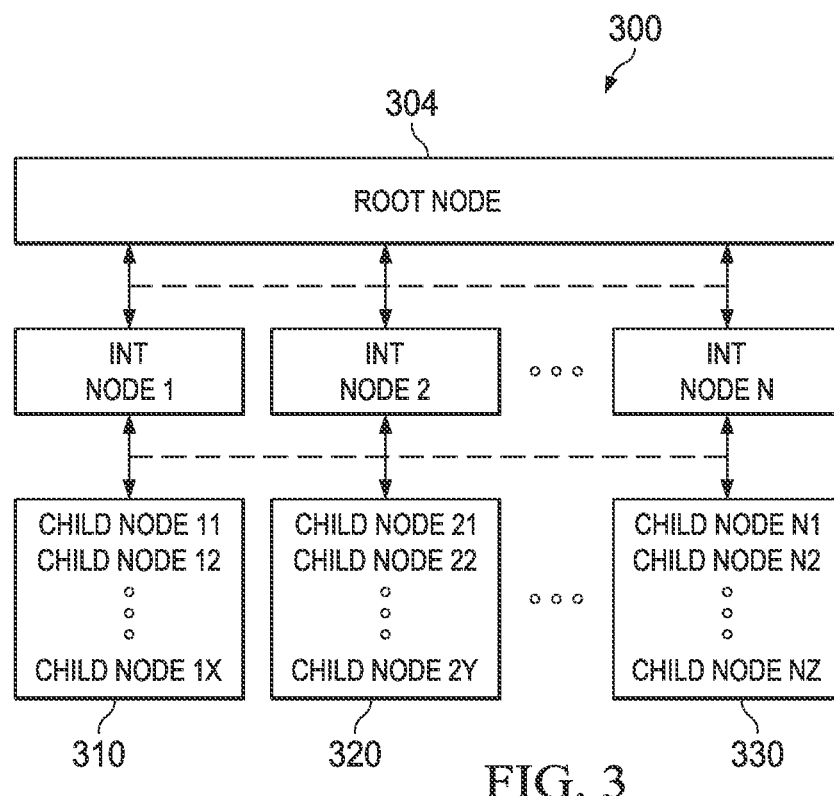
FIG. 3 illustrates an example network configuration that can be employed with a network for communications between a parent node, an intermediate node, and child nodes.

FIG. 3 illustrates an example network configuration 300 that can be employed with a network for communications between a parent node, an intermediate node, and child nodes. A top level in the network 300 can include a root node 304 which serves as a parent node to one or more intermediate nodes shown as INT NODE 1 though INT NODE N, where N is a positive integer. Thus, each of the intermediate nodes can be viewed as a child node of the parent node. In turn, each of the intermediate nodes 1 though N can have one or more child nodes attached thereto. The respective child nodes are sometimes referred to as leaf nodes in the network. For example, at 310, child nodes 11 through 1X can report to intermediate node 1 operating as a parent node, where X is a positive integer. At 320, child nodes 21 through 2Y can report to intermediate node 2 operating as a parent node, where Y is a positive integer. At 330, child nodes N1 through NZ can report to intermediate node N operating as a parent node, where N and Z are positive integers.

A dashed line is shown between nodes at the intermediate level and another dashed line is shown between nodes at the child level, where the dashed line represents that some nodes may be able to communicate between other members at a common hierarchy level and some nodes may not be able to communicate at the common level. In some network examples, intermediate nodes and/or child nodes may communicate with other nodes at their respective hierarchy levels depending on network topologies and network device locations. In other examples, communications can be routed to/from the respective child nodes, through the intermediate nodes, to the root node 320 in order to route messages from one node in the network to another node in the network that is not in the same linear path as a the respective root node, intermediate node, and child node. As noted previously, network routing tables are no longer needed to be utilized due to the address assignment protocols described herein. Each node may maintain a much smaller neighbor routing table however to facilitate communications amongst peers at a given level of the network hierarchy.

A link can be defined when a pair of nodes can directly communicate with each other. The concept of a neighbor node can be defined as a node, towards which the current node has a link to. The neighbor routing table operates with a routing algorithm that decides which links in the network to use in order to create an end-to-end connection between multiple nodes. The neighbor table concept, used in most routing algorithms, is a conceptual table (and contents are implementation dependent) where the routing algorithm stores a connection between the routing address (in this case IPV6) of a neighbor and the link address (in this case MAC address) of the same neighbor. This allows the current node to select the link to use in order to reach the next hop on the routing path.

Conventional routing tables on the other hand are used to speed up the process of path finding and to eliminate redundant communication overhead in conventional systems. The routing algorithm uses the routing table concept to cache information on how to reach a node in the network, to which the current node doesn't have a link. The routing techniques described herein, obviates the need for a routing table by creating a structured address space for each node. This allows a node to only use its Neighbor Table in order to find the link to use to reach a certain node. The resulting path starts from the current node, continues to the highest common tree ancestor and ends at the intended destination. This also includes the case that at any point of this path, if the same level neighbor has the longest address matching described below with respect to FIG. 4, that neighbor can be used instead of going higher in the hierarchy, shortening the path even further.

FIG. 4 illustrates an example network where child nodes derive network addresses from a network prefix of the parent nodes. A network hierarchy is formed having multiple levels from a top level at a root node 410, which communicates to lower level child nodes at lower levels of the hierarchy. In this example, the root node 410 includes an example prefix shown as (AA01020304050607). A child node 420 utilizes the network prefix (AA01020304050607) of the root 410 and appends its respective node number 01 in the example to form its unique network address (AA0102030405060701). Thus, at each succeeding lower level of the hierarchy, the address value assigned to the child node increases over the number of bits of its respective parent node by the number of bits appended to the network address of the parent node to create the unique address of the child node.

A child node 430 utilizes the network prefix (AA01020304050607) of the root 410 and appends its respective node number 02 in the example to form its unique network address (AA0102030405060702). A child node 440 utilizes the network prefix (AA0102030405060702) of the child node 2 at 430 and appends its respective node number 01 in the example to form its unique network address (AA010203040506070102 01). If the root 410 received a message destined for node 3, it can perform longest prefix matching to determine to which node to route the message.

In this example, a message designated for node 3 would have as part of its destination address the prefix (AA010203040506070102 01). Since node 2 at 430 would have the largest number of digits matching the message versus node 1 at 420, node 2 will receive the message and subsequently pass the message to node 3 at 440. Thus, longest prefix address matching can be used to determine the routing path in the network. This compares the IPV6 addresses of the packet's intended destination and IPV6 address of any neighbor node. The result can be calculated as the number of consecutively matching bits starting from the most significant bit if a post-appending (append to the LSB) is used and from least significant bit if a pre-appending (append to the MSB) is used (though this case is not currently implemented in the current IPV6 structure). As used herein the term append can be refer to either a pre-appending or a post-appending operation. The example address illustrated and described below with respect to FIG. 5 illustrates the adjustable address portion of the prefix to which to assign the unique network address described herein that is based on the network address of the parent node.

Figure 5:
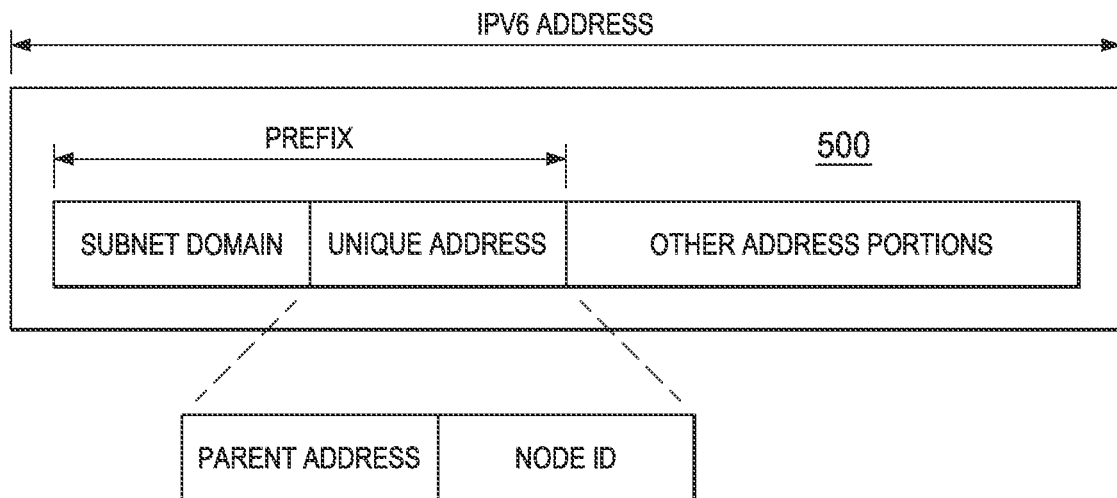
FIG. 5 illustrates an example of a network address that can be modified at a child node based on a network address of a parent node.

FIG. 5 illustrates an example of a network address 500 that can be modified at a child node based on a network address of a parent node. In this example, the address is an IPV6 Internet address. The address can include a prefix portion and other address portions that comprise the entire address. The prefix portion of the address 500 can include a fixed subnet domain address portion and a portion where the unique address can be assigned. As shown, the unique address portion includes the parent's address and a node identifier representing the assigned value of the number of bits to the parent address in this example. Using the example described above with respect to FIG. 4, the unique address of the parent node was (AA01020304050607). The portion AA010203 was the subnet domain and the portion 04050607 created uniqueness in combination with the subnet domain address. The child node 01 in that example could post-pend (or pre-pend) its node number (or other arbitrary number) to the portion 04050607 to create its own unique network address which was (AA0102030405060701). The prefix (similar to the subnet in IPV4) is generally assigned by an outside service provider according to the required address space. For example, if the prefix is assigned as the first 30 bits to a unique 30 bit value this leaves only 2 bits from a 32 bit value for the remaining address space, thus leading to a maximum of 4 devices in the network described herein.

Figure 6:
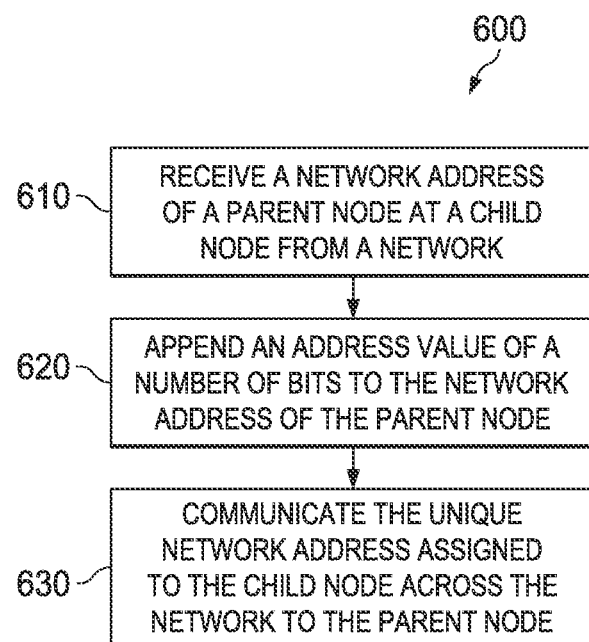
FIG. 6 illustrates an example method to generate a network address for a child node from the network address of the parent node.

In view of the foregoing structural and functional features described above, an example method will be better appreciated with reference to FIG. 6. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an IC or a processor, for example.

FIG. 6 illustrates an example method 600 to generate a network address for a child node from the network address of the parent node. At 610, the method 600 includes receiving a network address of a parent node at a child node from a network (e.g., via child node 120 and network 160 of FIG. 1). At 620, the method 600 includes appending an address value of a number of bits to the network address of the parent node to create the unique network address for the child node (e.g., via address generator of FIG. 1). At 630, the method 600 includes communicating the unique network address assigned to the child node across the network to the parent node (e.g., via network 160 of FIG. 1).

Although not shown, the method 600 can also include performing a comparison between address values of at least two child nodes and a destination address and routing a message to a destination node that is a closest match to the destination address. The method can include assigning the value of the number of bits to the unique network address of the child node via a predetermined identifier. The method can also include generating a random number to assign the address value of the number of bits to the unique network address of the child node. The method can also include utilizing a dynamic host configuration protocol (DHCP) to assign the address value of the number of bits to the unique network address of the child node. The method can include utilizing a domain name service (DNS) to determine a network address for at least one other node in the network.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:
1. A device comprising:
an address generator configured to assign a first address to the device, the first address uniquely identifying the device and including a first prefix; wherein:
the device is configured to:

receive a second address of a node that includes a second prefix that includes a subnet domain address portion and a second portion that is separate from the subnet domain address portion, wherein the subnet domain address portion and the second portion, in combination, uniquely identify the node, wherein the first prefix includes the subnet domain address portion, the second portion, and a device identifier appended to the second portion of the first address; and communicate to the node the first address via a network.

2. The device of claim 1, wherein the device identifier is a predetermined device identifier.

3. The device of claim 1, further comprising a random generator, wherein the device identifier is based on an output of the random generator.

4. The device of claim 1, wherein a number of bits of the of the device identifier is based on a number of nodes in a same level of hierarchy in the network as the device.

5. The device of claim 1, wherein the first prefix and the second prefix have the same number of bits.

6. The device of claim 5, wherein the first prefix and the second prefix have 32 bits.

7. The device of claim 1, wherein the device is configured to communicate to the node the first address using a destination advertisement object (DAO) message.

8. The device of claim 1, further comprising a duplicate detector configured to:
determine that a value of the device identifier conflicts with another node of the network, wherein, when the value of the device identifier conflicts with another node of the network, the address generator is configured to re-generate the value of the device identifier.

9. A method comprising:
receiving a first address of a first node that includes a first prefix that includes a subnet domain address portion and a second portion that is separate from the subnet domain address portion, wherein the subnet domain address portion and the second portion, in combination, uniquely identify the first node;
assigning, by the first node, a second address to a second node, the second address uniquely identifying the second node and including a second prefix that includes the subnet domain address portion, the second portion, and a node identifier appended to the second portion of the second address; and
transmitting a message by the first node to the second node over a network.

10. The method of claim 9, wherein the first node is a root node in the network.

11. The method of claim 9, wherein the first node is an intermediate node in the network.

12. The method of claim 9, wherein the first address is an Internet Protocol V6 (IPV6) Internet address and the second address is an IPV6 Internet address.

13. The method of claim 9, wherein the network is a routing for low power networks (RPL) protocol network.

14. The method of claim 9, wherein the node identifier is appended after the second portion of the first address.

15. The method of claim 9, wherein the node identifier is appended before the second portion of the first address.

16. A device comprising:
an address generator configured to:
receive a first address of the device that includes a first prefix that includes a subnet domain address portion and a second portion that is distinct from the subnet domain address portion, wherein the subnet domain address portion and the second portion, in combination, uniquely identify the device; and
assign a second address to a first node, the second address uniquely identifying the first node and including a second prefix that includes the subnet domain address portion, the second portion, and a node identifier appended to the second portion of the second address, wherein:
the device is configured to transmit a message to the first node over a network.

17. The device of claim 16, wherein the device is further configured to:
receive a request to join the network from the first node by receiving a destination advertisement object (DAO) message; and
in response to receiving the request to join the network from the first node, determine to not send a DAO message to a parent of the device.

18. The device of claim 16, wherein a number of bits of the node identifier is based on a number of nodes in a same level of hierarchy in the network as the first node.

19. The device of claim 16, wherein the message comprises a destination address, the device further comprising an address router configured to:
determine a longest prefix match to the destination address between the second address and a third address of a second node; and
route the message to the first node when the first node has the longest prefix match with the destination address.

20. The device of claim 16, wherein the network has a destination oriented directed acyclic graph (DODAG) configuration.

* * * * *